March 8, 1932.    E. L. JACKSON    1,848,784
CLOSET
Filed June 11, 1931    8 Sheets-Sheet 1

E. L. Jackson
INVENTOR

By Marks & Clerk
ATTYS.

March 8, 1932.  E. L. JACKSON  1,848,784
CLOSET
Filed June 11, 1931   8 Sheets-Sheet 2

E. L. Jackson
INVENTOR

By Marks & Clark
Attys.

March 8, 1932.  E. L. JACKSON  1,848,784
CLOSET
Filed June 11, 1931   8 Sheets-Sheet 3
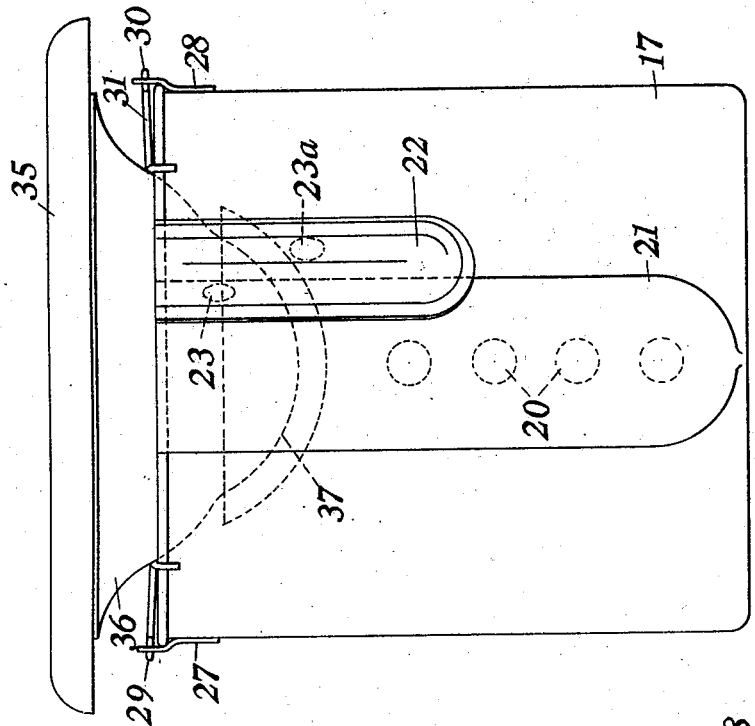
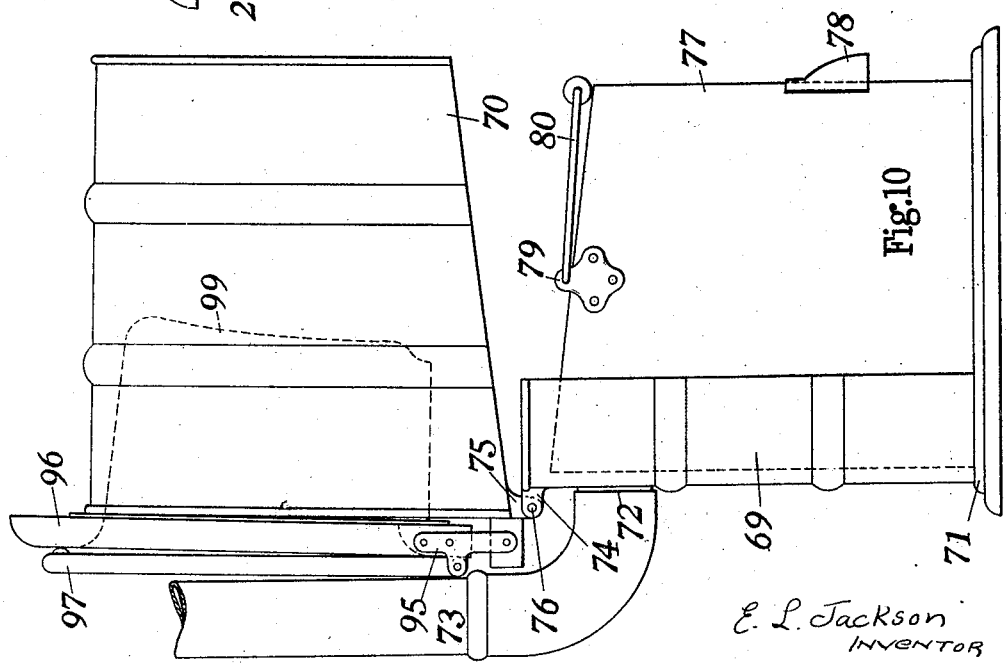
E. L. Jackson
INVENTOR
By Marks + Clark
Attys.

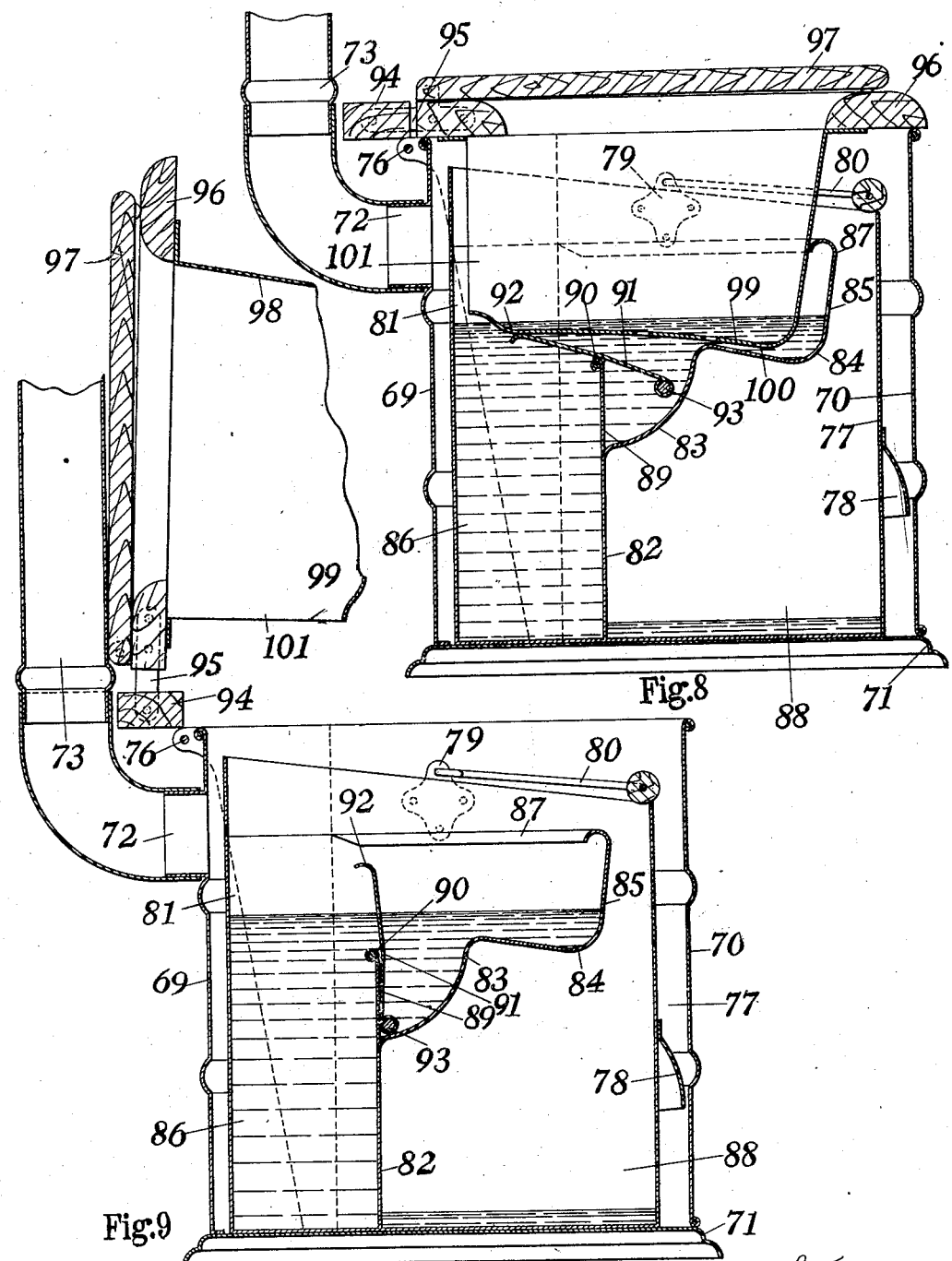

March 8, 1932   E. L. JACKSON   1,848,784
CLOSET
Filed June 11, 1931   8 Sheets-Sheet 6

E. L. Jackson
INVENTOR

By Marks & Clerk
Attys.

March 8, 1932.  E. L. JACKSON  1,848,784
CLOSET
Filed June 11, 1931  8 Sheets-Sheet 7

E. L. Jackson
INVENTOR

By: Marks & Clerk
ATTYS.

March 8, 1932.  E. L. JACKSON  1,848,784
CLOSET
Filed June 11, 1931  8 Sheets-Sheet 8
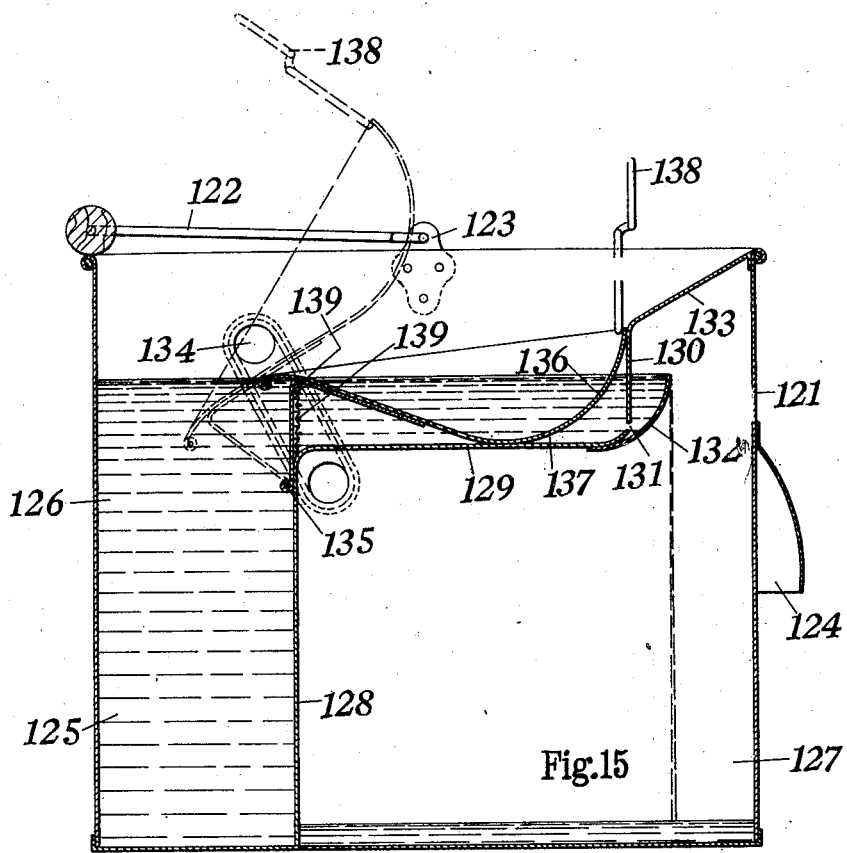
Fig.15
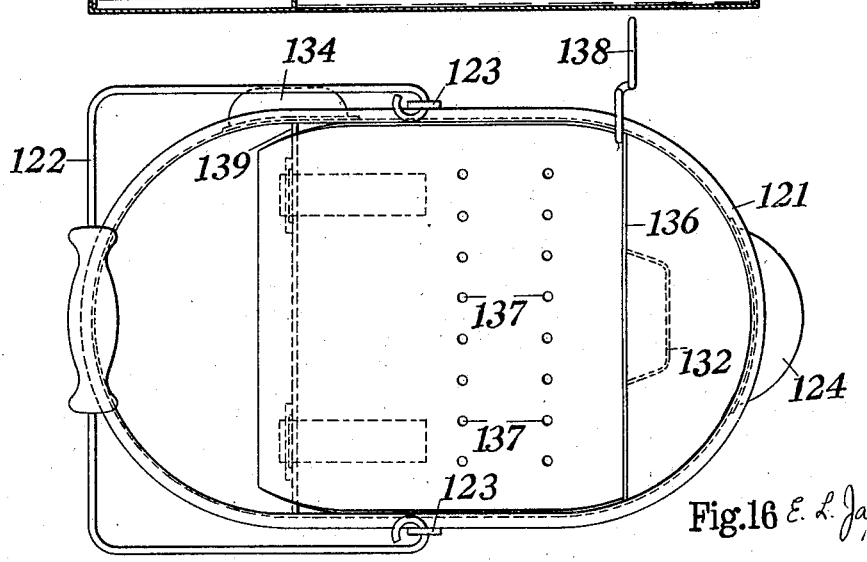
Fig.16  E. L. Jackson
INVENTOR
By: Marks & Clerk
ATTYS Patented Mar. 8, 1932

1,848,784

UNITED STATES PATENT OFFICE

EPHRAIM LOUIS JACKSON, OF LONDON, ENGLAND, ASSIGNOR TO JACKSONS (LONDON) LIMITED, OF LONDON, ENGLAND

CLOSET

Application filed June 11, 1931, Serial No. 543,675, and in Great Britain June 12, 1930.

This invention relates to closets of the kind in which a vessel adapted to receive the sewage and containing a liquid usually of a disinfectant character is associated with a shield arranged in such manner that when the closet is in normal use the shield will be in a position in which it will operate to prevent splashing of liquid from the vessel and is adapted to be moved in order to be freed from solid material deposited on it.

Hitherto, in such closets the shield has been arranged to be above the level of the liquid in the vessel when the closet is in use and thereafter to be moved into a position in which it is immersed in the body of liquid and difficulties have, in consequence, arisen in removing the last traces of solid material from the shield.

One feature of the present invention comprises mounting the shield in such manner that when the closet is in use the portion of the shield upon which solid material will be deposited is immersed in the body of liquid contained in the vessel and covered by a layer of the liquid of a predetermined depth.

A further feature of the invention consists in the arrangement of the shield in such manner that it operates to deliver the solid matter received by it into a vessel or compartment adapted to segregate the solid matter from the main portion of the liquid content of the device.

Optionally, the whole of the surface of the shield may be immersed in and covered with the liquid when the closet is in use.

Normally, the depth or height of the liquid above the shield, when the closet is in use, will be so proportioned that splashing of the liquid to an undesirable degree will not take place in normal use, and at the same time functioning to reduce the possibility of adhesion of solid matter to the shield.

Optionally, the shield may be perforated to allow liquid delivered into the vessel by way of the pan to pass directly into the body of liquid contained in the vessel.

Thus in accordance with the invention, the shield may be arranged in such manner that, to deliver the solid matter received by it, it will move in an upward direction about a horizontal axis.

For instance, in accordance with this feature of the invention, the shield may be arranged to be rotated about an axis in a direction to raise it above the body of liquid in the container after the closet has been used and thus, in consequence of such motion, to be freed from the solid material deposited on it.

In such case, conveniently, the vessel may be divided by a partition member in to two portions or sections, in one of which the solid matter will be accumulated.

A still further feature of the invention consists in the provision of means adapted to preclude solid material transferred from the shield into the liquid from returning into contact with the shield.

Thus there may be provided below and adjacent to the shield a perforated member extending into the liquid in such manner that solid material transferred from the shield into the liquid may contact only with that side of the perforated member remote from the shield.

Alternatively there may be provided below the shield a partition member with which is associated a pivotally mounted member adapted to move about its pivot in consequence of the movement of the shield in order in all positions of the shield to preclude access of solid material to the space in part enclosed by the said partition member.

As will be understood, in order that, notwithstanding repeated use of the closet, the shield may whenever the closet is in use be covered by a layer of liquid of a predetermined depth a constant level device is associated, in accordance with the invention, with the vessel with which the shield is associated.

The constant level device may, for example, be arranged to deliver a proportion of liquid from the vessel to a drain or the vessel may comprise in effect two communicating chambers with one of which the shield is primarily associated, while the other is arranged to receive the liquid from this chamber by way of a device adapted to maintain a constant level of liquid in the said chamber.

Where as is usual the vessel is designed to contain a body of liquid on the surface of which floats a layer of sealing liquid, the inlet to the constant level device will be arranged below the lower surface of the layer of sealing liquid.

The invention also extends to closets as above described in which the shield is in the form of a pan secured to the seat and adapted upon movement of the seat in an upward direction to transfer its contents into the liquid in the manner above specified.

In accordance with this feature of the invention the pan may be provided with a lip or spout through which material deposited into the pan may be transferred into the liquid.

In one construction in accordance with the invention, the device comprises a chamber within which partition members are arranged to form an inner chamber in turn divided into two sections by a perforated partition and having a shield pivoted adjacent to the upper edge of the perforated partition adapted normally to be covered by liquid when the closet is in use and to be rotated in an upward direction from this position to deposit the solid material received by it into one of the sections into which the inner member is divided by the partition in question, a constant level device or inverted syphon being provided to maintain a constant level of liquid within the inner chamber and to discharge excess of liquid into the outer chamber.

Further, from a point adjacent to the base of the outer chamber to a point above the normal level of the liquid in the inner chamber a conduit or duct may be provided through which, in the operation of emptying the device, the liquid collected in the outer chamber may be discharged.

Conveniently, a cover or screen is arranged in the upper portion of the inner chamber adapted to receive the solid matter, such screen being hinged so as to move about the same axis as that about which the shield is rotated.

Conveniently, the device is provided with a handle which may be in the form of a bail handle, while any suitable means may be associated with the shield for the purpose of depositing the solid material into the portion of the inner chamber designed to segregate the solid matter from the main portion of the liquid contents of the device.

The base of the inner chamber may be arranged at an inclination with the horizontal, while one wall of the outer chamber may have a fixed, inclined shield member extending in a downward direction from the upper extremity of one of its walls to the other edge of the shield.

A further feature of the invention consists in exposing a convex surface towards the pan when the closet is in use. The shield, for example, may be formed by a sphere or a section of a hollow sphere or other body bounded by a curved surface and in this case in the movement of the shield from the position in which it occupies, when the closet is in use, in the operation of depositing the sewage, it may be arranged to travel relatively to a member adapted to function as a scraper.

With this arrangement, the shield may be associated with a suitably formed partition member, for instance a partition member of cylindrical form arranged within the vessel adapted to receive the sewage so that in its motion its surface will be caused to bear against the edges of the partition member.

As in existing constructions, a closet of the kind to which the present invention relates, for moving the shield into the appropriate position in the use of the closet means actuated by raising and lowering the lid or seat thereof may be provided.

Alternatively, a handle or like member adapted to be operated in any convenient manner may be provided.

Further, means may be associated with the vessel adapted to receive the sewage for breaking up or disintegrating its solid components, such means being arranged to be operated in consequence of the motion imparted to the shield.

The invention will be described further in detail by way of example with reference to the accompanying drawings, in which:—

Figure 3 is a side elevation partly in section of a second construction, of which Figure 4 is an end elevation partly in section.

Figure 6 is an end elevation partly in section of a third construction, of which

Figure 8 is a side elevation in section of a fourth construction;

Figure 9 is a side elevation in section illustrating the method of operating the construction illustrated in Figure 8, while Figure 10 is a side view of the construction illustrated in Figures 8 and 9 showing details of construction of the outer casing of the construction illustrated in Figures 8 and 9;

Figures 13 and 14 illustrate, respectively, in sectional elevation and plan view a sixth construction, while Figures 15 and 16 illustrate, respectively, in sectional elevation and plan view a seventh construction.

Figure 1:
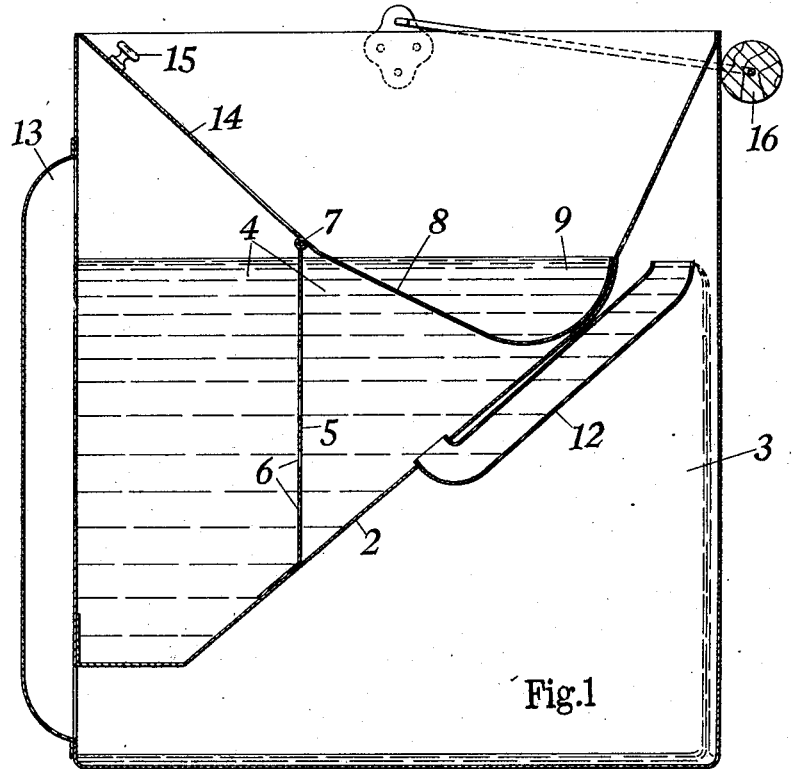
Figure 1 is an elevation in section of one construction in accordance with the invention.
Figure 2:
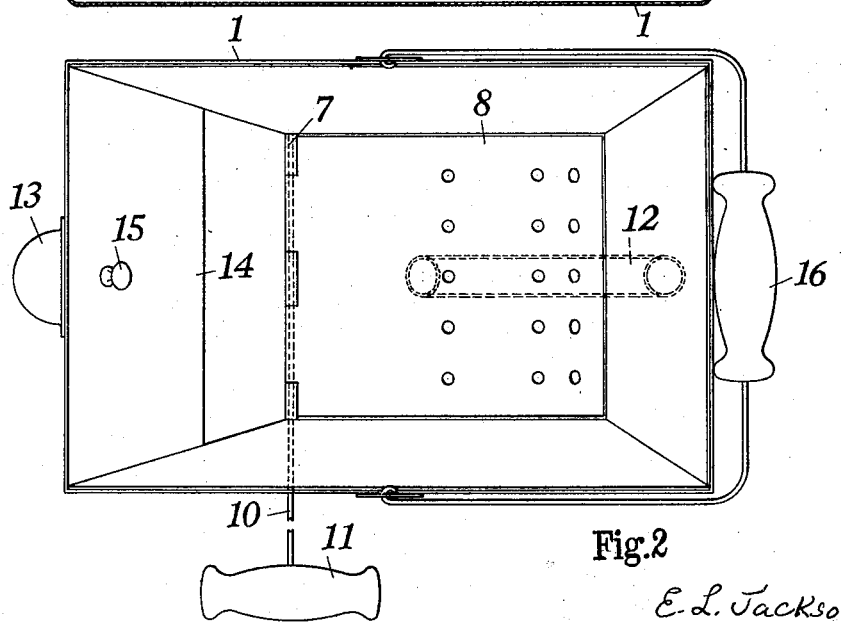
Figure 2 is a plan view of the construction illustrated in Figure 1.
Figure 3:
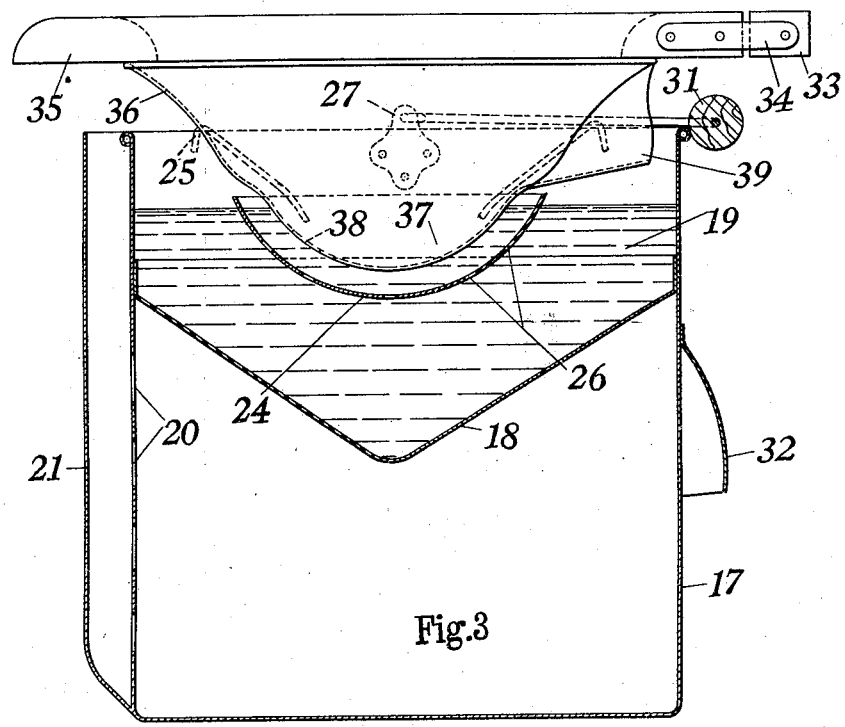
Figure 5:
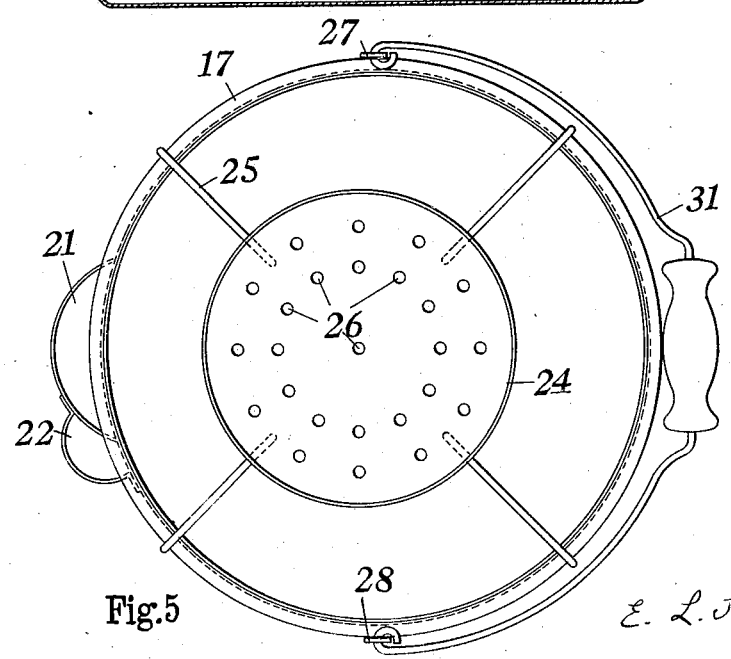
Figure 5 is a plan view thereof.

In the construction illustrated in Figures 1 and 2, 1 indicates a chamber within which there is arranged a partition member 2 extending in part at an inclination with the horizontal forming an outer or overflow chamber 3, and an inner chamber 4 which in turn is divided into two sections by a partition 5 provided with apertures 6 and having pivoted adjacent to its upper edge at 7 a shield 8 adapted normally when the closet is in use to be covered by liquid indicated by the reference numeral 9, and to be rotated in an upward direction from this position to deposit the solid material received by it into the section adjacent to the wall of the chamber by means of the rod 10 and operating handle 11, a pipe 12 adapted to maintain a constant level of liquid within the chamber 4 being associated with the partition member 2. By means of the perforated partition 5, solid materials are precluded from returning into that part of the liquid immediately below the shield when it is in its lowered position. The shield 8 is bounded by a curved surface the convex portion of which faces downwardly when the closet is in use and rests against a correspondingly curved portion of the partition 2. Extending from a point adjacent to the base of the outer chamber to a point above the normal level of the liquid in the inner chamber a conduit 13 is provided through which in the operation of emptying the device the liquid collected in the outer chamber may be discharged, and with the upper portion of the section adjacent to the external wall of the chamber which is adapted to receive the solid matter there is associated a screen 14 provided with a handle 15 by means of which it may be caused to move about the same axis 7 as that about which the shield is adapted to be moved. For facilitating transport of the device a handle 16 engaging with perforated lugs formed adjacent to the upper extremity of the outer chamber is provided.

In the construction illustrated in Figures 3, 4 and 5, 17 indicates a chamber within which there is provided a partition member 18 of conical form dividing the chamber into an upper and lower section, the former of which is adapted to contain liquid indicated by the reference numeral 19 and the latter of which is adapted to function as an overflow chamber communicating by means of the perforations 20 and the conduit 21 with the constant level conduit 22 which is provided with an overflow aperture 23 communicating with the said upper section and an aperture 23a communicating with the conduit 21, the liquid in the upper section being normally at the level of the aperture 23. Located above the conical partition 18 and dipping into the liquid 19 is the spherical surfaced plate 24 detachably secured to the upper extremity of the chamber 17 by means of the clips 25, the plate being provided with perforations 26 and adapted to present its convex surface towards the base of the chamber. For facilitating transport of the device there are secured to points adjacent to the upper extremity of the chamber 17 perforated ears 27, 28, engaging with the ends 29, 30, of the bucket handle 31, and to one side of the said chamber there is secured a lug 32 adapted to function as a bail lifting handle. Pivotally connected with the supporting member 33 by means of the hinge 34 is the seat 35 to which is secured the bowl 36 having a spherical surfaced portion 37 adapted when the seat is in the lowered position to present its convex surface towards the base of the chamber, the said convex portion being provided with apertures 38 through which when the seat is in the position illustrated liquid may be admitted, the bowl being provided also with a spout member 39 through which when the seat is raised material which has been deposited within the bowl may be transferred into the liquid contained in the upper section of the chamber, the perforated plate 24 serving to prevent contact between paper and other solid material in the said liquid and the underneath surface of the bowl 36.

Optionally, with such a construction the conical partition 18 may be formed with a cylindrical extension extending to the base of the chamber 17 so that the upper section is substantially in the form of a funnel.

Figure 6:
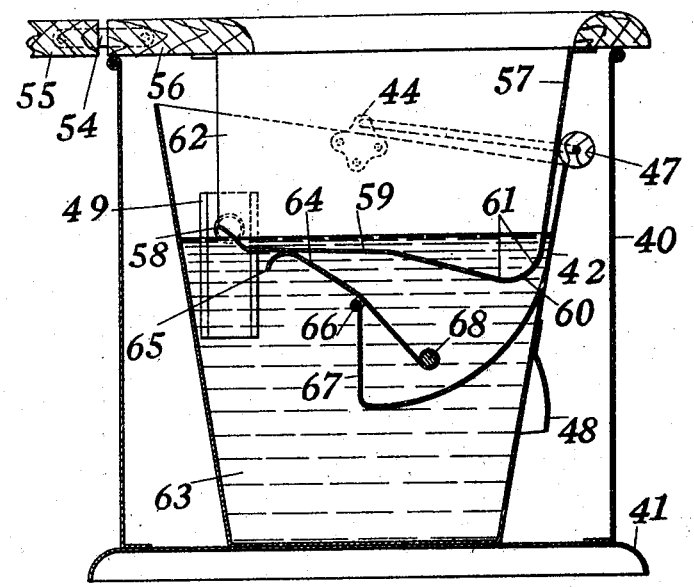
Figure 7:
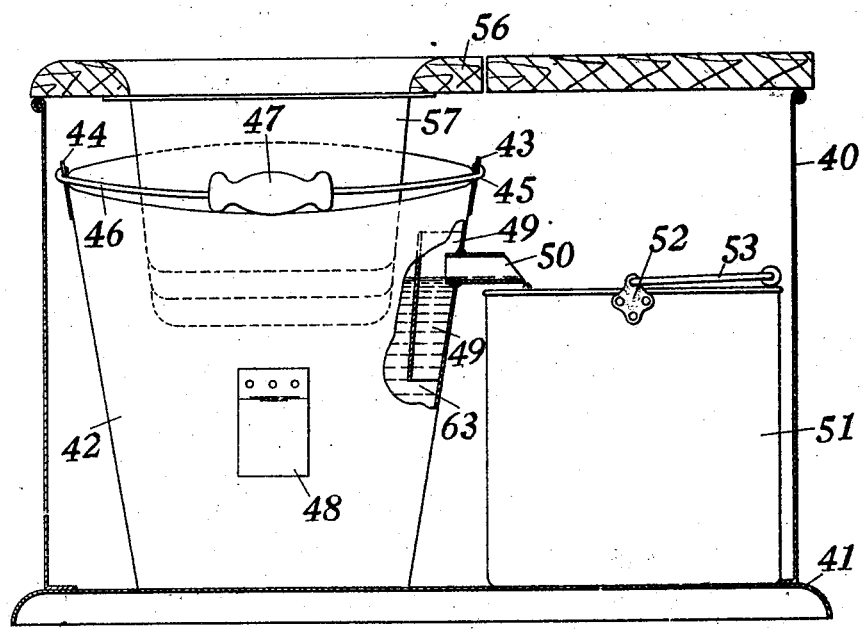
Figure 7 is a side elevation partly in section.
Figure 11:
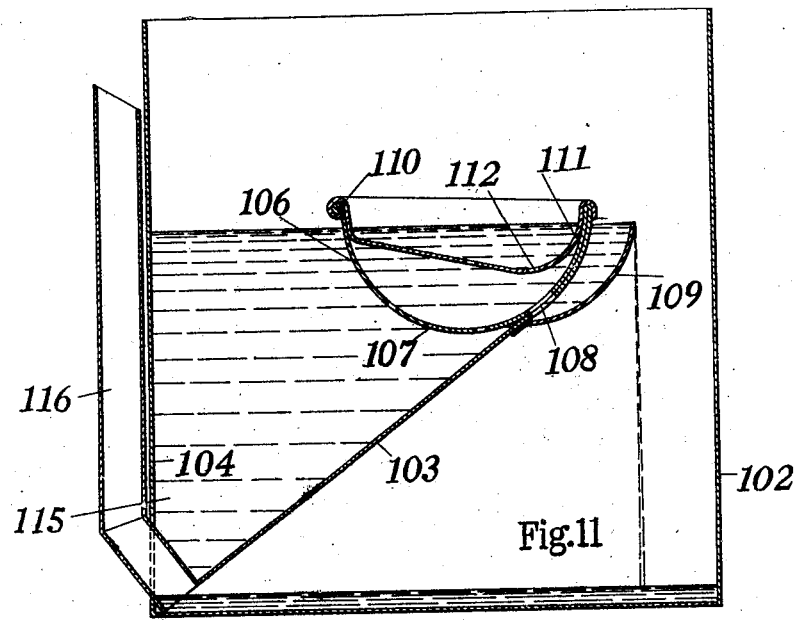
Figures 11 and 12 illustrate, respectively, in sectional elevation and plan view a fifth construction.
Figure 12:
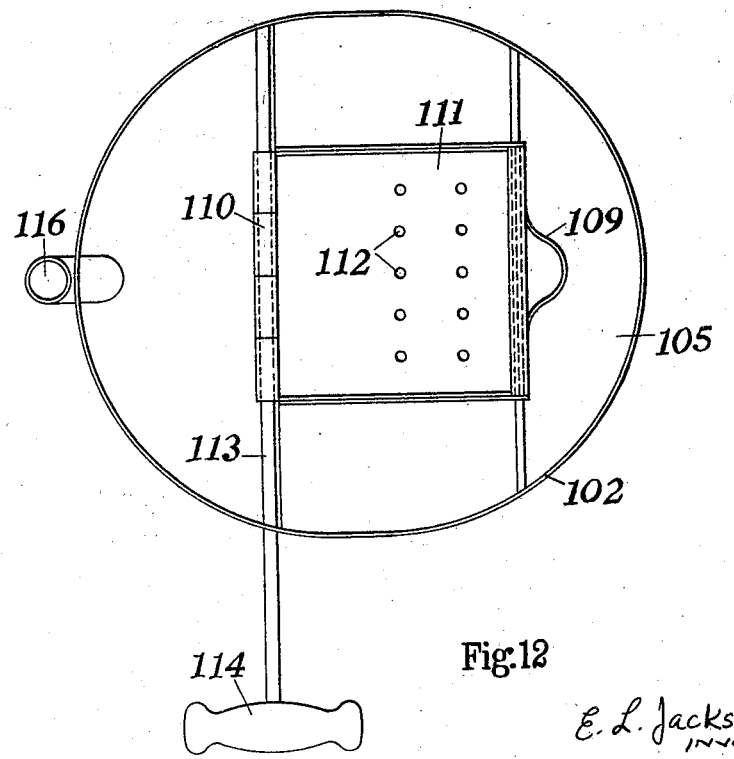
Figure 13:
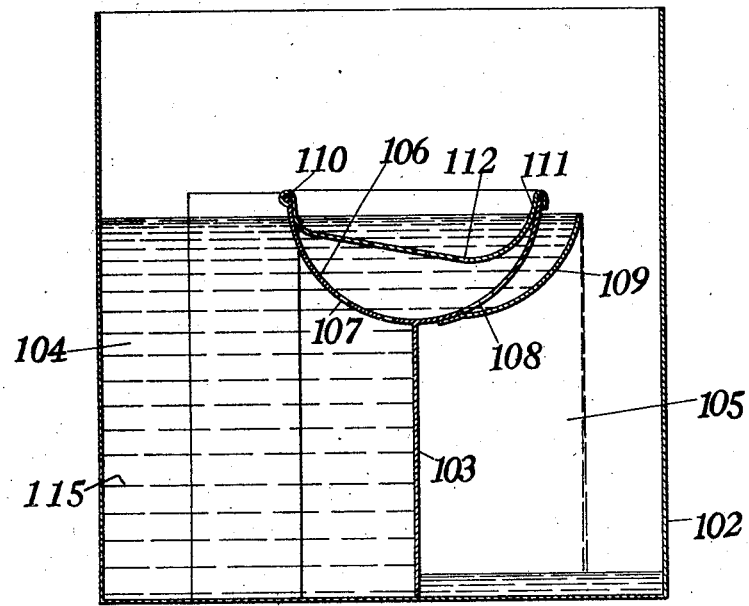
Figure 14:
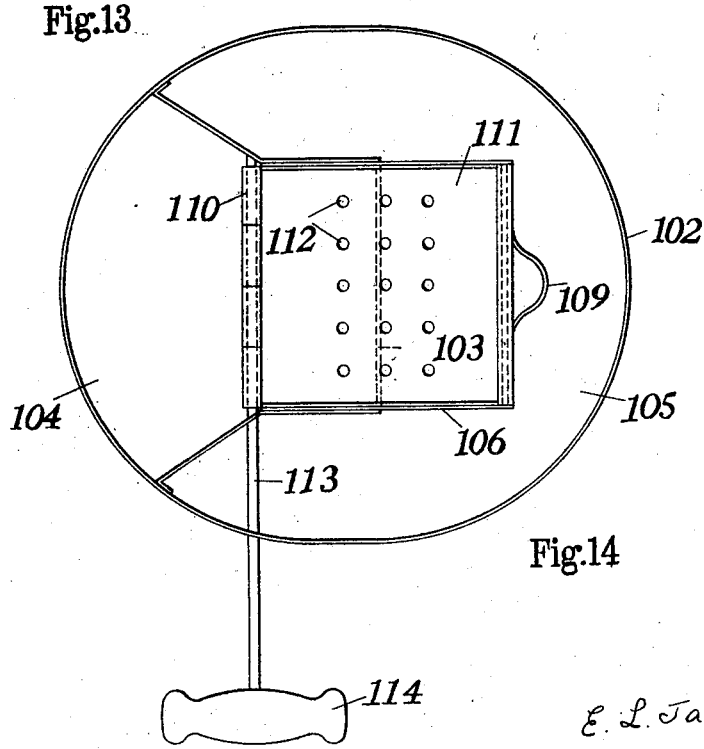

In the construction illustrated in Figures 6 and 7, 40 indicates an outer chamber supported upon a base 41 within which there is provided a sewage container 42 substantially in the form of a bucket provided with perforated ears 43, 44, with which there are engaged the ends, 45, 46, of the handle 47, a bail lifting handle 48 being secured to the side of the said container. Adjacent to the upper extremity of the container 42 there is provided a constant level device in the form of a conduit 49 adapted by means of the overflow 50 to deliver liquid therefrom into the overflow container 51 constituted by a cylindrical vessel provided with ears 52 with which are engaged the ends of the handle 53. Pivotally connected by means of the hinge 54 with the supporting member 55 is the seat 56 to which is secured the bowl 57 the base of which comprises a lip 58, a substantially flat portion 59 and a concave portion 60, the liquid in the sewage container being normally at such a level that when the seat is in its lowered position liquid is contained within the portion 60 and covers the flat portion 59 to a small depth. For admitting liquid to the base of the bowl when it is in the lowered position the concave portion is provided with aperture 61. When the seat is raised material deposited within the bowl when the closet is used is transferred through the open side 62 of the bowl into the liquid 63 in the sewage container, contact of paper or other solid matter in the said liquid with the underneath surface of the bowl being precluded by the action of the tipping plate 64 having a curved portion 65 adjacent to its upper extremity, a pivotal connection 66 with the partition member 67 secured to the side of the container and a weight 68 secured to its lower extremity. As will be understood, when the seat is raised in order to transfer the contents of the bowl into the sewage container the plate 64 will be caused under the action of the weight 68 to swing towards a vertical portion in which it will function as a partition, thereby precluding the transfer of paper and other solid matter into that part of the sewage container immediately below the bowl.

A similar construction to that just described is illustrated in Figures 8, 9 and 10, in which 69 and 70 indicate respectively the two portions of an outer casing supported upon a base 71, the portion 69 being stationarily mounted upon the said base and provided adjacent to its upper extremity with a flanged outlet 72 to which is secured the ventilating pipe 73, while the portion 70 is pivotally connected by means of the lugs 74, 75, and the pin 76, with the portion 69, the arrangement being such that in order to facilitate access to the interior of the device the portion 70 may be moved about its pivotal connection with the portion 69 from the position shown in Figures 8 and 9 to the position shown in Figure 10. Located within the outer casing upon the base 71 is a chamber 77 in the form of a substantially cylindrical vessel to the side of which there is secured a bail lifting handle 78 and to the upper extremity of which by means of the perforated lugs 79 there is secured the handle 80. Within the chamber 77 there is located a sewage containing compartment 81 bounded in part by the wall of the said chamber and in part by a partition member having a vertical portion 82, an upwardly curved portion 83 presenting its convex surface in a downward direction and a concave portion 84 provided with an overflow aperture 85 whereby liquid (indicated by the reference numeral 86) within the said compartment may be maintained at a constant level, the portion of the partition adjacent to its upper extremity being formed with an inwardly and downwardly directed flange 87, and the overflow compartment 88 being constituted by that portion within the chamber 77 exterior to the sewage containing compartment 81. The vertical portion 82 of the partition member is formed with an upstanding portion 89 the upper extremity of which is provided with a bent over portion constituting part of the hinge 90 by means of which the tipping plate 91 is pivotally connected therewith, the plate being provided adjacent to its upper extremity with a curved portion 92 and at its lower extremity with a weight 93, the object of the upstanding portion and the tipping plate being to prevent the return of paper and other solid matter to that portion of the sewage containing compartment bounded by the curved portion 83 and the concave portion 84 of the partition. Adjacent to the pivotal connection between the portions 69 and 70 there is provided a support 94 to which by means of the hinge 95 is pivotally connected the seat 96 and the seat cover 97, and to the former there is secured a bowl 98 provided in its base with a sloping portion 99 to which liquid may be admitted when the seat is in the lowered position by means of apertures 100, the bowl also being provided with an opening 101 through which when the seat is raised from the position shown in Figure 9 to the position shown in Figure 10 matter deposited within the bowl may be transferred to the sewage containing compartment.

In the constructions illustrated in Figures 11 to 14, an outer chamber 102 is divided by means of a partition 103 into a sewage containing compartment 104 and an overflow compartment 105, a substantially cylindrical surfaced bowl 106 provided with perforations 107 communicating with the compartment 104 and perforations 108 communicating with a spout 109 being secured adjacent to the upper extremity of the said partition. Pivotally connected by means of the hinge 110 to the upper extremity of one edge of the bowl 107 is the pan 111 provided with apertures 112 and adapted by means of the rod 113 and the handle 114 to be moved about the axis of the hinge 110 in an upward direction in order to transfer matter deposited in the said pan into the liquid 115 contained in the compartment 104, and in the construction illustrated in Figures 11 and 12 a conduit 116 communicating with the overflow compartment is provided.

In the construction illustrated in Figures 15 and 16 an outer chamber 121 provided with a handle 122 engaging the upper portion thereof by means of the perforated lugs 123 and having secured to its side a bail lifting handle 124 is divided by means of a partition into a sewage containing compartment 125 adapted to contain liquid 126 and an overflow compartment 127, the said partition comprising a vertical portion 128 and a horizontal portion 129, a further vertical portion 130 provided with orifices 131 adjacent to which there is formed a spout member 132 and an upwardly directed sloping portion 133 secured at its upper extremity to the wall of the chamber 121. Communicating between the compartment 127 and the compartment 125 at a level above the level of the liquid 126 there is provided an overflow conduit 134. Pivotally connected with the vertical portion 128 of the partition by means of the hinge 135 is the bowl 136 having a cylindrically surfaced base provided with apertures 137 through which liquid may be admitted and a handle 138 by means of which in order to transfer matter deposited in the bowl into the compartment 125 the bowl may be moved about the axis of the hinge 135 from the position shown in full line to the position shown in dotted. Extending across from side to side of the chamber 121 is the rod 139 between which and a point adjacent to the juncture of the vertical and the horizontal portions of the partition there extends coarse mesh wire gauze 140 adapted to prevent the return of solid matter from the compartment 125 into that part of the said compartment immediately below the bowl 136.

In conclusion it is to be observed that the above detailed description is furnished for the purpose of indicating the nature of the invention and that the constructional details and arrangements may be varied within wide limits without exceeding the scope of the application.

Having now described my invention, what I claim as new and desire to secure by Letters Patent is:—

1. A closet comprising a vessel adapted to contain liquid of a disinfectant character, a shield mounted in the vessel, means adapted to move the shield from a position in which when the closet is in use, solid material is adapted to be deposited thereon to a second position in which the shield is adapted to be freed from such solid material, and means adapted when the shield is in the first-mentioned position to cause the same to be covered with a layer of liquid of a predetermined depth.

2. A closet comprising a vessel adapted to contain liquid of a disinfectant character, a shield mounted in the vessel, means adapted to move the shield from a position in which when the closet is in use, solid material is adapted to be deposited thereon, to a second position in which the shield is adapted to transfer such solid material into the liquid, means adapted when the shield is in the first-mentioned position to cause the same to be covered with a layer of liquid of a predetermined depth, and means adapted to preclude the solid material transferred into the liquid from returning into contact with the shield.

3. A closet comprising a vessel adapted to contain liquid of a disinfectant character, a partition member dividing the vessel into two sections, a shield upon which solid material is adapted to be deposited mounted in the vessel and extending in the position in which it is adapted to receive solid material into one of the sections, means adapted to move the shield from the said position into a second position in which it is adapted to deliver the material received thereon into the other section, means adapted to permit circulation of liquid between the two sections while precluding the passage of solid material from the second-mentioned section into the first-mentioned section, and means adapted when the shield is in the first-mentioned position to cause the same to be covered with a layer of liquid of a predetermined depth.

4. A closet comprising a vessel adapted to contain liquid of a disinfectant character, a perforated shield mounted in the vessel, means adapted to move the perforated shield from a position in which when the closet is in use, solid material is adapted to be deposited thereon, to a second position in which the perforated shield is adapted to be freed from such solid material, and means adapted when the perforated shield is in the first-mentioned position to cause the same to be covered with a layer of liquid of a predetermined depth.

5. A closet comprising a vessel adapted to contain liquid of a disinfectant character, a shield mounted in the vessel, means adapted to move the shield in an upward direction about a horizontal axis from one position in which when the closet is in use, solid material is adapted to be deposited thereon, to a second position in which the shield is adapted to be freed from such solid material, and means adapted when the shield is in the first-mentioned position to cause the same to be covered with a layer of liquid of a predetermined depth.

6. A closet comprising a vessel adapted to contain liquid of a disinfectant character, a shield mounted in the vessel, means adapted to raise the shield above the body of liquid in the vessel from a position in which when the closet is in use, solid material is adapted to be deposited thereon, to a second position in which the shield is adapted to be freed from such solid material, and means adapted when the shield is in the first-mentioned position to cause the same to be covered with a layer of liquid of a predetermined depth.

7. A closet comprising a vessel adapted to contain liquid of a disinfectant character, means adapted to move the shield from a position in which when the closet is in use, solid material is adapted to be deposited thereon, to a second position in which the shield is adapted to be freed from solid material, a perforated member extending into the liquid below and adjacent to the shield adapted to preclude the return of such solid material into contact with the shield, and means adapted when the shield is in the first-mentioned position to cause the same to be covered with a layer of liquid of a predetermined depth.

8. A closet comprising a vessel adapted to contain liquid of a disinfectant character, a partition member dividing the vessel into two sections, a shield upon which solid material is adapted to be deposited mounted in the vessel and extending in the position in which it is adapted to receive solid material into one of the sections, means adapted to move the shield from the said position into a second position in which it is adapted to deliver the material received thereon into the other section, a member pivotally connected with the partition member adapted to move about its pivot in consequence of the movement of the shield in order in all positions of the shield to preclude access of solid material into the first-mentioned section, and means adapted when the shield is in the first-mentioned position to cause the same to be covered with a layer of liquid of a predetermined depth.

9. A closet comprising a vessel adapted to contain liquid of a disinfectant character, a partition member dividing the vessel into two sections, a shield upon which solid material is adapted to be deposited mounted in the vessel and extending in the position in which it is adapted to receive solid material into one of the sections, means adapted to move the shield from the said position into a second position in which it is adapted to deliver the material received thereon into the other section, means adapted to permit circulation of liquid between the two sections while precluding the passage of solid material from the second-mentioned section into the first-mentioned section, a constant level device adapted when the shield is in the first-mentioned position to cause the same to be covered with a layer of liquid of a predetermined depth and to permit overflow of excess liquid from the first-mentioned section, and means adapted to receive such excess liquid from the first-mentioned section.

10. A closet comprising a vessel adapted to contain liquid of a disinfectant character, a seat movably associated therewith and adapted to be raised from a substantially horizontal position which it occupies when the closet is in normal use, to a second position, a pan secured to the seat within which solid material is adapted to be deposited and adapted in consequence of movement of the seat from the first-mentioned position to the second-mentioned position to be freed from such solid material, and means adapted when the pan is in the first-mentioned position to cause the same to be covered with a layer of liquid of a predetermined depth.

11. A closet comprising a vessel adapted to contain liquid of a disinfectant character, a seat movably associated therewith and adapted to be raised from a substantially horizontal position which it occupies when the closet is in normal use, to a second position, a pan secured to the seat within which solid material is adapted to be deposited, a spout member connected with the pan through which when the seat is raised from the first-mentioned position to the second-mentioned position solid material deposited in the pan is adapted to be transferred into the liquid, and means adapted when the pan is in the first-mentioned position to cause the same to be covered with a layer of liquid of a predetermined depth.

12. A closet comprising a vessel, a partition member dividing the vessel into two sections, one of which is adapted to contain liquid of a disinfectant character and the other of which is adapted to function as an overflow chamber, a perforated partition dividing the first-mentioned section into two compartments, a shield upon which solid material is adapted to be deposited pivotally connected with the upper edge of the perforated partition and extending in the position in which it is adapted to receive solid material into one of the compartments, means adapted to move the shield about its pivotal connection with the perforated partition from the said position into a second position in which it is adapted to deliver the material received thereon into the other compartment, and means adapted when the shield is in the first-mentioned position to cause the same to be covered with a layer of liquid of a predetermined depth and to deliver excess liquid collecting in the said compartment into the overflow chamber.

13. A closet comprising a vessel, a partition member dividing the vessel into two sections, one of which is adapted to contain liquid of a disinfectant character and the other of which is adapted to function as an overflow chamber, a perforated partition dividing the first-mentioned section into two compartments, a shield upon which solid material is adapted to be deposited pivotally connected with the upper edge of the perforated partition and extending in the position in which it is adapted to receive solid material into one of the compartments, means adapted to move the shield about its pivotal connection with the perforated partition from the said position into a second position in which it is adapted to deliver the material received thereon into the other compartment, means adapted when the shield is in the first-mentioned position to cause the same to be covered with a layer of liquid of a predetermined depth and to deliver excess liquid collecting in the said compartment into the overflow chamber, and a duct extending from a point adjacent to the base of the overflow chamber to a point above the normal liquid level of the first-mentioned section through which in the operation of emptying the device the liquid collected in the overflow chamber may be discharged.

14. A closet comprising a vessel, a partition member dividing the vessel into two sections, one of which is adapted to contain liquid of a disinfectant character and the other of which is adapted to function as an overflow chamber, a perforated partition dividing the first-mentioned section into two compartments, a perforated shield upon which solid material is adapted to be deposited pivotally connected with the upper edge of the perforated partition and extending in the position in which it is adapted to receive solid material into one of the compartments, means adapted to move the perforated shield about its pivotal connection with the perforated partition from the said position into a second position in which it is adapted to deliver the material received thereon into the other compartment, means adapted when the perforated shield is in the first-mentioned position to cause the same to be covered with a layer of liquid of a predetermined depth and to deliver excess liquid collecting in the said compartment into the overflow chamber, and a duct extending from a point adjacent to the base of the overflow chamber to a point above the normal liquid level of the first-mentioned section through which in the operation of emptying the device the liquid collected in the overflow chamber may be discharged.

15. A closet comprising a vessel, a partition member dividing the vessel into two sections, one of which is adapted to contain liquid of a disinfectant character and the other of which is adapted to function as an overflow chamber, a perforated partition dividing the first-mentioned section into two compartments, a shield upon which solid material is adapted to be deposited pivotally connected with the upper edge of the perforated partition and extending in the position in which it is adapted to receive solid material into one of the compartments, means adapted to move the shield about its pivotal connection with the perforated partition from the said position into a second position in which it is adapted to deliver the material received thereon into the other compartment, a screen pivotally connected with the vessel adapted to permit access to the compartment into which solid material is adapted to be delivered, and means adapted when the shield is in the first-mentioned position to cause the same to be covered with a layer of liquid of a predetermined depth and to deliver excess liquid collecting in the said compartment into the overflow chamber.

16. A closet comprising a vessel, a partition member dividing the vessel into two sections, one of which is adapted to contain liquid of a disinfectant character and the other of which is adapted to function as an overflow chamber, a perforated partition dividing the first-mentioned section into two compartments, a shield upon which solid material is adapted to be deposited pivotally connected with the upper edge of the perforated partition and extending in the position in which it is adapted to receive solid material into one of the compartments, means adapted to move the shield about its pivotal connection with the perforated partition from the said position into a second position in which it is adapted to deliver the material received thereon into the other compartment, a screen pivotally connected with the vessel adapted to permit access to the compartment into which solid material is adapted to be delivered, means adapted when the shield is in the first-mentioned position to cause the same to be covered with a layer of liquid of a predetermined depth and to deliver excess liquid collecting in the said compartment into the overflow chamber, and a duct extending from a point adjacent to the base of the overflow chamber to a point above the normal liquid level of the first-mentioned section through which in the operation of emptying the device the liquid collected in the overflow chamber may be discharged.

17. A closet comprising a vessel adapted to contain liquid of a disinfectant character, a shield having a convex surface mounted in the vessel, means adapted to move the shield from a position in which when the closet is in use, solid material is adapted to be deposited on the convex surface, to a second position in which the shield is adapted to be freed from such solid material, and means adapted when the shield is in the first-mentioned position to cause the same to be covered with a layer of liquid of a predetermined depth.

In testimony whereof I have signed my name to this specification.

EPHRAIM LOUIS JACKSON.